Feb. 7, 1933.            R. D. EVANS            1,896,773

PROTECTIVE SYSTEM

Filed April 27, 1929

INVENTOR
Robert D. Evans.
BY
Chesley G. Carr
ATTORNEY

Patented Feb. 7, 1933

1,896,773

UNITED STATES PATENT OFFICE

ROBERT D. EVANS, OF SWISSVALE, PENNSYLVANIA, ASSIGNOR TO WESTINGHOUSE ELECTRIC & MANUFACTURING COMPANY, A CORPORATION OF PENNSYLVANIA

PROTECTIVE SYSTEM

Application filed April 27, 1929. Serial No. 358,620.

My invention pertains to a protective system for electric distribution circuits and, more particularly, to distribution circuits of the type employed in alternating-current-railway systems.

In systems of the type described, it is customary to supply the contact lines or trolley conductors, a plurality of which are connected in parallel, from transformers located at substations along the line of the railway. The transformers draw energy from a high-tension transmission line or any other suitable source. Circuit breakers are provided in the trolley circuits, at both ends of the sections defined by the substations, for isolating any one or more of the conductors from the substation bus to which they are all connected, the bus itself being connected to the secondary of the substation transformer.

Numerous disadvantages have been experienced in attempts to utilize known protective systems for the isolation of faults occurring on trolley conductors in circuits of the type described. Because of the possibility of inductive interference with neighboring communication systems, it is essential that faults occurring in such circuits shall be isolated with the utmost dispatch, and it is desirable that the circuit breakers at the two ends of a section of a trolley conductor shall be tripped simultaneously. It is also highly desirable that no conductor, other than that on which the fault has occurred, be isolated from its energy source, so that needless interruptions in service may be avoided.

One object, therefore, of my invention is to provide means for selectively isolating one of a number of parallel trolley conductors on which a fault has occurred, whereby a faulty conductor will always be isolated, and all other conductors will be unaffected.

It is desirable that such operation be effected regardless of the generating capacity available for furnishing energy to a fault, and it is a further object of my invention to meet this condition.

It is also an object of my invention to effect the simultaneous operation of sectionalizing circuit breakers on the occurrence of fault over a wider range of the distance between adjacent substations than has been possible heretofore.

It is also an object of my invention to obtain an increased ratio between line impedance and distance along the line, especially in the neighborhood of the transformer substations. The reasons for, and advantages of, this characteristic will become more apparent hereinafter.

In accordance with my invention, I propose to employ the so-called instantaneous impedance relay for selectively isolating one of a plurality of trolley conductors, in combination with a device, which I shall describe in detail hereinafter, called a compensating transformer. It is the function of this device to modify the effect of the current traversing one of the trolley conductors on the current winding of the impedance relay, in accordance with the magnitude of the current traversing another conductor in parallel therewith.

For a complete description of my invention, reference is made to the accompanying drawing, in which, Figure 1 is a single-line diagram of a portion of a distribution system to which my invention is applicable;

Figure 4:
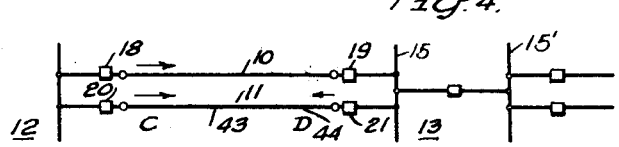
Figure 5:
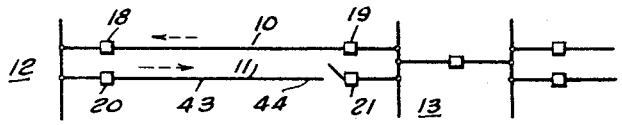
Figure 6:
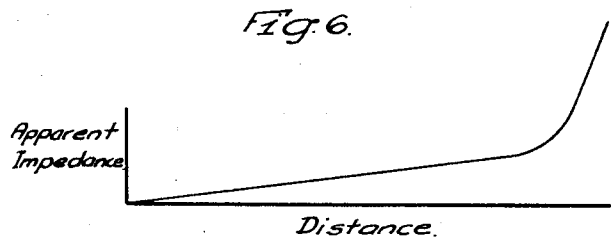

Figs. 4 and 5 are additional schematic diagrams, similar to that of Fig. 1, in connection with which an explanation of the operation of the system of my invention will be given; and Fig. 6 is a curve, similar to that of Fig. 2, except that it illustrates the variation in the apparent impedance of a line circuit, as measured by an impedance relay in combination with a compensating transformer, with the distance along the line.

Figure 1:
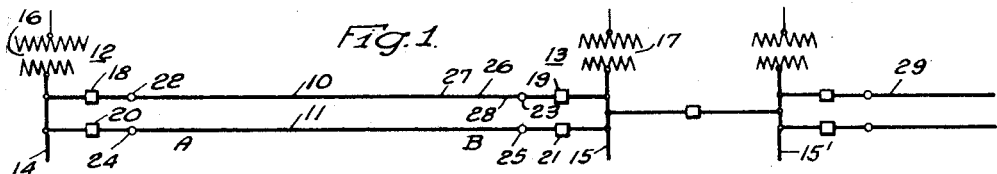
Figure 2:
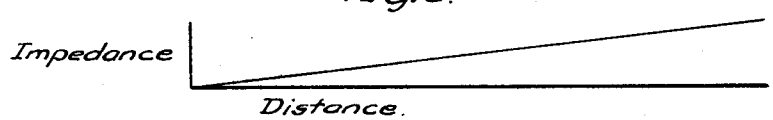
Fig. 2 is a curve illustrating the variation of the impedance of the distribution circuit, as measured by the impedance relay, with the distance along the circuit to be protected.

Referring in detail to Fig. 1, a plurality of contact lines or trolley conductors 10 and 11 extend between adjacent transformer substations 12 and 13. At the substations, the trolley conductors 10 and 11 are connected to substation buses 14 and 15, which are energized through step-down transformers 16 and 17, the primary windings of which are adapted to be connected to a high-tension transmission line (not shown). At the ends of the conductors 10 and 11, circuit breakers 18, 19 and 20, 21 are interposed to permit the complete isolation of either conductor from its energy source. The individual relay equipment for controlling the circuit breakers is indicated at 22, 23, 24 and 25.

For the purpose of describing my invention, it may be assumed that this relay equipment consists of an instantaneous impedance relay having a current-responsive actuating winding and a voltage-responsive restraining winding. A time-delay relay of this current-actuated, voltage-restrained, so-called "impedance"-responsive type is illustrated and described in U. S. Patent No. 1,292,584, and a specific embodiment of such relay which I propose to employ is also shown in the copending application, Serial No. 437,924, filed March 20, 1930, by Leslie N. Crichton and Robert D. Evans and assigned to Westinghouse Electric & Manufacturing Company. In addition to the actuating and restraining elements, the instantaneous impedance relay, which I propose to employ, may also be provided with a load presetting arrangement which is disclosed in said copending application but is not shown herein, since it is not part of the present invention, although a highly desirable adjunct thereof in a commercial installation.

It is well known that the impedance relay, since it is actuated in accordance with current and restrained in accordance with voltage, actually measures the impedance of the circuit to which it is connected. In the usual distribution circuit, such as the section 10 of the trolley conductor between substations 12 and 13 of Fig. 1, disregarding all connected load, for the moment, the impedance of a portion of the circuit under short-circuited conditions is proportional to its length. Fig. 2, therefore, illustrates the variation in the impedance of the circuit of conductor 10, as measured by an impedance relay, such as 22 in accordance with the distance from the station 12. In Fig. 2, it will be observed that the ratio of impedance to distance is comparatively small and constant. For this reason, because of the practical limitation to the sensitivity of any relay, it is impossible for an impedance relay to measure the impedance of a fault condition or, in other words, the distance of the fault from the relay within less than a certain distance representing the permissive error. It is thus entirely possible that a fault at the point 26 would cause an operation of the impedance relay 22 just as effectively as a similar fault at the point 27. In other words, it is impossible to so set the relay that it will trip on the occurrence of a fault at 27 and will not trip on the occurrence of a fault at the point 26.

For a large portion of the distance between the stations 12 and 13, the slight inaccuracy of the relay is of substantially no moment, since it is desired to trip the circuit breaker 18 on the occurrence of a fault anywhere on section 10, whether at point 26 or at point 27. For faults occurring between points such as A and B, therefore, the impedance relay is quite satisfactory when used as has been heretofore suggested.

When a fault occurs near the end of the section, however, it is obvious that the relay 22 may be unable to distinguish between a fault adjacent to the bus 15, say at point 28, and a fault adjacent to the bus 15′, say at point 29, since the difference in impedance of the line circuit, as measured by the relay 22 from the point 28 to the point 29, is comparatively slight, in fact, the impedance of the circuit 10, from station 12 to point 28, is almost identical with the impedance of the same circuit from the station 12 to the point 29. Under these conditions, if a fault occurs at the point 29, the relay 22 will operate to trip the breaker 18, since it must be so set as to trip upon the occurrence of a fault at point 28. This operation, however, violates the condition above mentioned, namely, that no unnecessary tripping shall be effected. It thus becomes necessary to provide means for varying the ratio of impedance of the circuit to the distance from the relay in the neighborhood of the ends of the section conductors.

Figure 3:
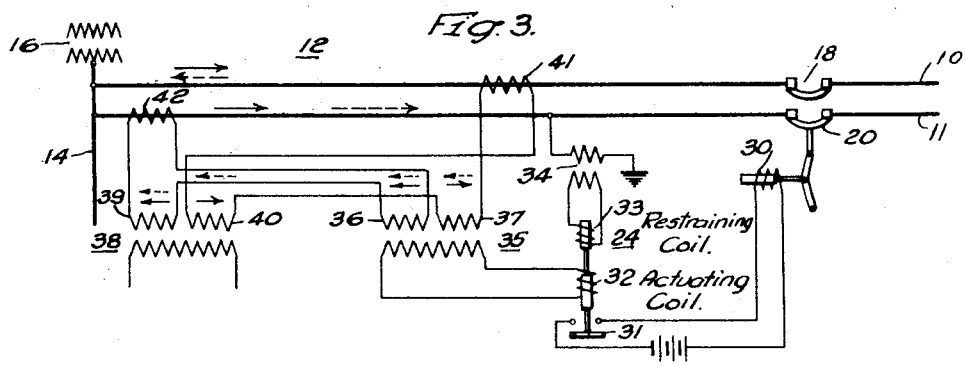
Fig. 3 is a circuit diagram illustrating, in detail, the improvement with which I propose to obtain the advantages hereinabove set forth.

The means which I provide for effecting this result are shown in Fig. 3 which illustrates, in somewhat greater detail than Fig. 1, the circuit breakers and protective relays associated with conductors 10 and 11 at the station 12. In Fig. 3, the power transformer, station bus, trolley conductors, circuit breakers and relays are indicated by the same reference numerals as in Fig. 1. The circuit breaker 20 in the conductor 11 is adapted to be opened by the operation of a tripping coil 30 which is controlled by a contact 31 of the impedance relay 24. This relay consists of a movable contact-carrying element which is adapted to be actuated by the energization of a current winding 32. The movable element is restrained by a voltage winding 33 which is energized from a potential transformer 34 connected to the conductor 11.

The current winding 32 of the relay 24 is energized from a so-called compensating transformer 35, the secondary winding of the latter being connected to the current-responsive actuating-coil 32 of the impedance relay. The primary winding of the transformer 35 consists of two portions 36 and 37. A second compensating transformer 38 is provided for energizing the current winding of an impedance relay 22 for controlling the operation of the circuit breaker 18, and the primary winding of the said compensating transformer is divided into two portions 39 and 40. The tripping mechanism of the circuit breaker 18 is not shown in Fig. 3 since it is identical with that of the circuit breaker 20.

The usual current transformers 41 and 42 are connected in series with the conductors 10 and 11. The secondary windings of the current transformers, however, are not connected to the current windings of the relays in the usual manner but are connected to the primary windings of the compensating transformers, the current transformer 42 being connected to the windings 36 and 39 of the compensating transformers 35 and 38, and the secondary of the current transformer 41 being connected to the primary windings 37 and 40.

The operation of the system of my invention to produce the desirable results specified above will now be described in connection with Figs. 4 and 5, which illustrate two conditions of the distribution system which are apt to be met in practice. By way of introduction, it should be pointed out that, upon the occurrence of a fault at a point, such as 43, in section conductor 11, the fault current will be supplied equally by stations 12 and 13, and there will be no energy supplied from either station to the fault through the conductor 10. If the fault occurs, at a point 44, it will be apparent that energy will be supplied to the fault from stations 12 and 13 through the conductor 11, and also from station 12 through conductor 10 and the circuit breakers 19 and 21. Assuming the occurrence of a fault at the point 44, (Fig. 4) energy is supplied from stations 12 and 13, through the conductors 10 and 11, in the direction of the solid arrows, the length of the arrows in Fig. 3 being intended as a rough indication of the magnitude of energy supplied.

Referring again, for the moment, to Fig. 3, it will be observed that the current in conductor 10 sets up a magnetic effect in the primary winding 37 which is in opposition to that set up in the winding 36 by the current traversing the conductor 11. The same condition exists in the primary windings of the compensating transformer 38. The result of the condition is to limit the energization of the actuating winding 32 of the relay 24 to a lower value than would be reached if said winding were connected directly to the current transformer 42. For this fault location and these line-current conditions, the limitation of the energization of the current-responsive actuating winding of the impedance relay 24 causes the relay to operate as if the impedance of the fault were greater than it actually is. If the relay is set for an impedance lower than that indicated by the relay, under the conditions just described, the circuit breaker 20 will not trip.

The relay 25, (Fig. 1), which is adapted to trip the circuit breaker 21, however, indicates a much lower value of fault impedance than the relay 24, because the fault 44 is much closer to the former than the latter. The circuit breaker 21 is thereby tripped, and conditions become as illustrated in Fig. 5. Upon the occurrence of such conditions, the supply of energy to the fault is different from that indicated in Fig. 4 and is shown by the dotted arrows in Fig. 5. The direction of the flow of energy through the conductor 11 is unchanged, but that of the energy flowing through conductor 10 is reversed. The effect of this change on the impedance relay 24 will be obvious from a consideration of the dotted arrows, as applied to Fig. 3. It will be seen that the magnetic effects of the energization of the windings of the compensating transformers 35 and 38 now produce a cumulative effect, so that the result is as if the impedance of the fault had suddenly been greatly lowered. This condition, of course, causes immediate tripping of the relay 24 to open the circuit breaker 20. The effect of the compensating transformer on the line impedance is illustrated graphically in Fig. 6 which is similar to Fig. 2 except that, near the end of the circuit section, a much higher ratio of impedance to distance obtains.

The above description of successive tripping of the circuit breakers 21 and 20 is based upon the assumption of a fault adjacent to the circuit breaker 21. Similar operations result, thereon, in reverse order when faults occur near the circuit breaker 20. For a considerable portion of the distance between the stations 12 and 13, however, the occurrence of a fault will produce simultaneous operation at the circuit breakers 20 and 21. This condition results because a negligible amount of reverse-current energy is supplied from conductor 10 through the bus 14 at station 12 to a fault on line 11 at a point quite close to station 12 and even at other points more remote from station 12. It is only at points quite close to the remote station 13 that the reverse-current energy supplied by the good conductor 10 is of sufficient magnitude, as compared with the short-circuit current in the faulty conductor 11, to make an important change in the apparent impedance of the line 11, as indicated in Fig. 6. The same condition also holds true for relay 23 in line 10 for the same faults located on line 11. Thus for a considerable portion, say from C to D or 80% of the distance between the stations 12 and 13, the relays 24 and 25 operate simultaneously upon the occurrence of a fault. These results are considerably superior to the best obtained with the impedance relay alone, or the usual overcurrent relay, with which it was possible to obtain simultaneous operation for the occurrence of faults within about 50% of the distance between stations.

It will be apparent from the foregoing description and explanation that the system of my invention provides numerous additional advantages over those of the prior art, which will be apparent to those skilled in such matters.

Although I have described and illustrated but a single embodiment of my invention, alterations and changes therein will, no doubt, suggest themselves, and it is not therefore, my intention to be limited to the system disclosed, except as necessitated by the terms of the appended claims.

I claim as my invention:

1. An electric distribution system comprising a plurality of parallel-connected circuits, sources of energy adapted to be connected to said circuits at spaced points, circuit breakers for sectionalizing said circuits and for isolating sections of said circuits from said sources, instantaneous impedance relays for controlling said circuit breakers, current transformers in said circuits, a differential, compensating current transformer having primary windings adapted to be individually energized by said first-mentioned current transformers, and a secondary winding connected to the current winding of said impedance relay.

2. The combination with a plurality of parallel-connected distribution circuits, circuit-breakers at the ends thereof and impedance relays for controlling said circuit breakers, of current transformers connected in said circuits, and compensating transformers each having multiple primary windings and a secondary winding, one of the primary windings of each of said compensating transformers being connected in series to one of said current transformers, and the secondary winding being connected to the current coil of one of said impedance relays.

3. A protective system for parallel-connected supply circuits having circuit breakers therein, including impedance relays having actuating and restraining windings for controlling the operation of said breakers, and means for energizing the actuating winding in accordance with the current in all of said circuits.

4. In combination, a plurality of electric circuits, circuit breakers in each circuit, an impedance relay for governing the operation of each of said breakers, and means for energizing the actuating winding of said relay in accordance with the currents in said circuits comprising a series transformer in each of said circuits and a differential transformer for each circuit having a split primary winding adapted to be energized jointly by said series transformers.

5. A relay system for controlling circuit breakers in parallel-connected distribution circuits including an impedance relay, means for energizing a current winding and a voltage winding of said relay in accordance with the current and voltage, respectively, of one of said circuits and means for modifying the energization of said current winding in accordance with the current in another of said circuits.

6. The combination with a relay having a current-responsive actuating winding and a voltage-responsive restraining winding, of a plurality of circuits, means for energizing said actuating winding in proportion to the magnitude of the current traversing one of said circuits, and means for varying the energization of said winding in proportion to the magnitude of the current traversing another of said circuits.

7. In a protective system for one of a plurality of parallel-connected distribution circuits, including sectionalizing circuit breakers, impedance relays for controlling said breakers and means for energizing said relays whereby they respond to an apparent impedance of a fault which is greater than the actual impedance thereof so long as energy is fed to the fault from both ends of the section defined by said circuit breakers.

8. In a protective system for one of a plurality of parallel-connected distribution circuits, including sectionalizing circuit breakers, impedance relays for controlling said breakers and means for modifying the energization of said relays upon the occurrence of a fault near the ends of the section defined by said circuit breakers, whereby the apparent impedance of said fault, as measured by said relay, is greater than the actual impedance thereof.

9. An electrical distribution system comprising at least the following elements in combination: a pair of parallel-connected lines, buses joining the same in two spaced substations, a source of electric energy connected to each of said buses, a circuit-breaker at each end of each of said lines, an instantaneous impedance relay for controlling each of said circuit-breakers, and compensating means for so energizing each of said impedance relays that it responds to the algebraic difference between a function of the current flowing in the associated line from the adjacent bus and a function of the current flowing in the other line from the adjacent bus.

10. The invention, as defined in claim 9, characterized by the fact that each impedance relay is adjusted to be actuated into breaker-tripping position whenever the apparent impedance ratio of the line-voltage to the aforesaid differential current is less than a predetermined value which is materially greater than the actual impedance ratio of the line-voltage to the actual line current when a dead short circuit is applied to the remote end of the line.

11. The combination, with an electric-supply bus having two or more distribution lines connected thereto, of a relay for each line, a current-responsive actuating mechanism and a voltage-responsive restraining mechanism for each relay, and compensating means for so energizing the current-responsive mechanism of each relay that it responds to the algebraic difference between a function of the current flowing in the associated line from the adjacent bus and a function of the current flowing in another line from the adjacent bus.

12. In a distribution system comprising a circuit to be protected, circuit-breaker means for isolating said circuit, and other circuit-means in parallel to said circuit, a relay system for controlling said circuit-breaker means, said relay system including a fault-distance-responsive relay means having current terminals and voltage terminals, means for energizing said current and voltage terminals of said fault-distance-responsive relay means in accordance with current and voltage, respectively, of said circuit to be protected, and means for modifying the effective energization of said fault-distance-responsive relay means in response to said parallel circuit-means.

13. In a distribution system comprising a circuit to be protected, circuit-breaker means for isolating said circuit, and other circuit-means in parallel to said circuit, a relay system for controlling said circuit-breaker means, said relay system including a fault-distance-responsive relay means having current and voltage windings, means for energizing said current and voltage windings in accordance with the current and voltage, respectively, of said circuit to be protected, and means for modifying the current-winding energization of said fault-distance-responsive relay means in response to the current in said parallel circuit-means.

In testimony whereof, I have hereunto subscribed my name this 22nd day of April, 1929.

ROBERT D. EVANS.